United States Patent
Berning et al.

(10) Patent No.: US 11,761,157 B2
(45) Date of Patent: *Sep. 19, 2023

(54) SELF-PROPELLED CONSTRUCTION MACHINE

(71) Applicant: Wirtgen GmbH, Windhagen (DE)

(72) Inventors: Christian Berning, Zulpich (DE); Sebastian Drumm, Rosrath (DE)

(73) Assignee: Wirtgen GmbH

( * ) Notice: Subject to any disclaimer, the term of this patent is extended or adjusted under 35 U.S.C. 154(b) by 0 days.

This patent is subject to a terminal disclaimer.

(21) Appl. No.: 18/073,005

(22) Filed: Dec. 1, 2022

(65) Prior Publication Data

US 2023/0160158 A1 May 25, 2023

Related U.S. Application Data

(63) Continuation of application No. 17/211,117, filed on Mar. 24, 2021, now Pat. No. 11,519,140.

(30) Foreign Application Priority Data

Apr. 3, 2020 (DE) ...................... 10 2020 204 383.3

(51) Int. Cl.
*F16H 47/02* (2006.01)
*E01C 23/088* (2006.01)
(Continued)

(52) U.S. Cl.
CPC .......... *E01C 23/088* (2013.01); *B60K 17/356* (2013.01); *F16H 47/04* (2013.01);
(Continued)

(58) Field of Classification Search
CPC ...... E01C 23/088; E01C 19/004; E01C 21/00; E01C 23/12; E01C 23/127; B60K 17/356;
(Continued)

(56) References Cited

U.S. PATENT DOCUMENTS 3,298,174 A 1/1967 Stoyke et al.
3,637,036 A 1/1972 Swisher, Jr. et al.
(Continued)

FOREIGN PATENT DOCUMENTS

CN 105102813 A 11/2015
CN 216193859 U 4/2022
(Continued)

OTHER PUBLICATIONS

European Search Report for corresponding patent application No. EP 21166679, dated Aug. 12, 2021, 3 pages.
(Continued)

*Primary Examiner* — Justin Holmes
(74) *Attorney, Agent, or Firm* — Lucian Wayne Beavers; Patterson Intellectual Property Law, PC

(57) ABSTRACT

A road milling machine includes a machine frame, at least three travelling devices, a milling drum, and at least one hydraulic drive system. The hydraulic drive system includes at least one hydraulic pump, at least one hydraulic fixed displacement motor for driving at least one driven travelling device, and one each hydraulic variable displacement motor for driving the remaining travelling devices. A first gearbox is arranged between the fixed displacement hydraulic motor and its associated travelling device. One each second gearbox is arranged between each of the hydraulic variable displacement motors and their associated travelling devices. The transmission ratio of the first gearbox is lower than the transmission ratios of the second gearboxes and/or the displacement volume of the fixed displacement motor is smaller than the maximum displacement volume of the variable displacement motors.

20 Claims, 6 Drawing Sheets

(51) Int. Cl.
  *B60K 17/356* (2006.01)
  *F16H 47/04* (2006.01)
  *E01C 19/00* (2006.01)
(52) U.S. Cl.
  CPC ......... *B60Y 2200/41* (2013.01); *E01C 19/004* (2013.01); *F16H 2047/025* (2013.01)
(58) Field of Classification Search
  CPC ............... F16H 47/04; F16H 2047/025; B60Y 2200/41; B28D 1/18; E02F 9/205
  See application file for complete search history.

(56) References Cited

U.S. PATENT DOCUMENTS

| | | | |
|---|---|---|---|
| 5,159,992 | A | 11/1992 | Reinecke et al. |
| 6,106,073 | A | 8/2000 | Simons et al. |
| 9,546,654 | B2 | 1/2017 | Rabhi |
| 11,519,140 | B2 * | 12/2022 | Berning ................ E01C 23/088 |
| 2006/0039756 | A1 | 2/2006 | Emke |
| 2010/0021234 | A1 * | 1/2010 | Willis ................... E01C 23/088 417/399 |
| 2013/0000996 | A1 | 1/2013 | Miller et al. |
| 2015/0057899 | A1 | 2/2015 | Kohmaescher |
| 2021/0310203 | A1 | 10/2021 | Berning et al. |

FOREIGN PATENT DOCUMENTS

| | | | | |
|---|---|---|---|---|
| DE | 102004040135 | B3 | 12/2005 | |
| DE | 102019120973 | A1 * | 2/2021 | |
| EP | 916004 | B1 | 9/1999 | |
| EP | 3789633 | A1 * | 3/2021 | ............. B60K 17/10 |
| GB | 1023033 | A | 3/1966 | |
| GB | 1588789 | A | 4/1981 | |
| JP | 11190414 | A | 7/1999 | |
| WO | WO-9511815 | A1 * | 5/1995 | ........... B60K 17/356 |
| WO | WO-2009146922 | A1 * | 12/2009 | ........... B60K 17/356 |

OTHER PUBLICATIONS

First Office Action for corresponding China patent application No. 2022042202439550, dated Apr. 26, 2022, 10 pages.

* cited by examiner

SELF-PROPELLED CONSTRUCTION MACHINE

BACKGROUND OF THE INVENTION

Field of the Invention

The present invention relates to a self-propelled construction machine.

Description of the Prior Art

Self-propelled construction machines, in particular road milling machines, are known, which comprise a machine frame and at least three travelling devices and at least one working device, in particular a milling drum, for working the ground pavement.

Furthermore, such self-propelled construction machines comprise at least one hydraulic drive system for driving at least two travelling devices, wherein the hydraulic drive system comprises at least one hydraulic pump, wherein the hydraulic drive system comprises, on each of the driven travelling devices, at least one motor and one gearbox arranged between the motor and the travelling device. It is particularly preferred that a hydraulic fixed displacement motor is provided on one driven travelling device and, for driving the remaining driven travelling devices, one each hydraulic variable displacement motor is provided for driving the travelling device via one each gearbox.

In the state of the art, fixed displacement motors are used, for example, on the driven travelling devices that are realized as pivotable travelling devices because a hydraulic fixed displacement motor features a smaller installation space than a hydraulic variable displacement motor. A pivotable travelling device may be pivotable about at least one vertical pivoting axis in relation to the machine frame from at least one first pivoted-in into at least one second pivoted-out position. On one side of the machine frame, namely, on the so-called zero-clearance side of the machine frame, the working device may terminate flush with the same. The pivotable travelling device may be arranged on said zero-clearance side of the machine frame, wherein the pivotable travelling device, in the first pivoted-in position, does not project in relation to the machine frame on the zero-clearance side, and in the at least second pivoted-out position, projects in relation to the zero-clearance side. The pivotable travelling device may preferably be a rear travelling device.

When the working device mills close to the edge along the wall of a house, for example, or a similar obstacle, the pivotable travelling device may be transferred into the first pivoted-in position, which enables the construction machine to drive significantly closer to the obstacle than would be the case if the travelling device were arranged next to the working device and were in the pivoted-out position. On the other hand, when not milling close to the edge, it is desired for the travelling device to be arranged next to the working device so that the machine achieves a more stable support.

There is frequently the problem, however, that fixed displacement motors are provided in the pivotable driven travelling devices, and due to the fact that the pivotable travelling devices are each arranged next to or close to the respective milling drum, slip may occur earlier with said pivotable travelling devices than is the case for the ground-engaging units arranged further away from the working device. The working device, in particular the milling drum, when working the ground, exerts force on the ground. In the case of a milling drum, for example, cutting tools penetrate the ground from above. Since a certain resistance has to be overcome to that end, a force opposing the weight force occurs. In the extreme case, the entire weight of the machine may rest on the working device, in particular milling drum. But even if said extreme case does not occur, the vertical force to be borne by the travelling devices is reduced. As a result of the machine geometry, this affects in particular those travelling devices which feature the smallest distance to the working device. Slip occurs therefore in particular with the pivotable travelling device.

The hydraulic variable displacement motor may also be termed a controllable hydraulic motor. A hydraulic variable displacement motor, or controllable hydraulic motor, is a hydraulic motor, or hydro motor, which is driven by means of a pressure fluid and is adjustable in rotational speed and/or torque at a constant volumetric flow rate and constant pressure of the hydraulic fluid, in particular in the hydraulic supply line assigned to the respective hydraulic variable displacement motor.

The hydraulic fixed displacement motor may also be termed a non-controllable hydraulic motor. A hydraulic fixed displacement motor, or non-controllable hydraulic motor, is a hydraulic motor, or hydro motor, which is driven by means of a pressure fluid and exhibits a constant rotational speed, or is not adjustable in rotational speed, respectively, at a constant volumetric flow rate of the hydraulic fluid, in particular in the hydraulic supply line assigned to the respective hydraulic fixed displacement motor.

The displacement volume of the variable displacement motors is usually adjustable between a minimum, in particular of zero, and a maximum displacement volume. In fluid engineering, the displacement volume of hydraulic motors refers to the amount of hydraulic fluid consumed by the hydraulic motor per revolution. Variable displacement motors have a variable displacement volume. Self-propelled construction machines according to the state of the art normally comprise a hydraulic drive system that comprises a hydraulic fixed displacement motor for driving one driven travelling device and one each hydraulic variable displacement motor for driving the remaining driven travelling devices. In this design, the displacement volume of the fixed displacement motor corresponds to the maximum displacement volume of the variable displacement motors. It is thus achieved that, when setting the maximum displacement volume of the variable displacement motors, all hydraulic motors present on the construction machine may be operated at the same operating parameters. In particular, when setting the maximum displacement volume on the variable displacement motors, which corresponds to the displacement volume of the fixed displacement motor, all hydraulic motors then provide, at the same hydraulic volumetric flow rate, the same rotational speeds and torques at the respective driven shafts.

Furthermore, there is the problem that, when the construction machine is not in working operation and is merely intended to travel from one location to another at high speed, the travelling device that is arranged on the fixed displacement motor limits the maximum speed of the construction machine.

SUMMARY OF THE DISCLOSURE

It is therefore the object of the present invention to improve the milling operation as well as the transport operation in the aforementioned construction machines.

The aforementioned object is achieved by the features of the claims.

The present invention advantageously provides that the transmission ratio of the first gearbox between the fixed displacement motor and the associated travelling device is lower than the respective transmission ratios of the second gearboxes, which are each arranged between the respective hydraulic variable displacement motors of the respective travelling device, and/or that the displacement volume of the fixed displacement motor is smaller than the maximum displacement volume of the variable displacement motors.

Each of the variable displacement motors exhibits one each minimum and maximum displacement volume.

If the displacement volume of the fixed displacement motor is smaller than the maximum displacement volume of the variable displacement motors, the first gearbox may also feature the same transmission ratio as the respective second gearboxes.

The present invention has the advantage that, as a result of a low transmission ratio on the first gearbox and/or the smaller displacement volume of the fixed displacement motor, a smaller torque is applied to the travelling device assigned to the fixed displacement motor during the milling operation. It is thus possible to reduce the risk of slip on said travelling device.

Furthermore, it is ensured by the design of the construction machine according to the present invention that the travelling device on which the fixed displacement motor is arranged may be moved at a higher speed in order to move the construction machine from one location to another location.

During transport travels, when the construction machine is merely moved from one location to another and there is usually no milling operation taking place, a high driving torque is not required at the travelling devices in comparison with the milling operation. For transport travels, the existing variable displacement motors may therefore be set so as to enable a high rotational speed at low torque in order to thus optimize the travelling speed of the construction machine. To this end, the displacement volume of the variable displacement motors is reduced.

Such adjustment is not possible on the fixed displacement motor, however, and in the state of the art, this results in a large part of the volumetric flow rate required for the travel drive being required for the fixed displacement motor which, in conjunction with the inherently limited delivery rate of the hydraulic pump, thus limits the maximum achievable travelling speed.

The use of a first gearbox driven by the fixed displacement motor, which features a smaller transmission ratio than the second gearboxes driven by the variable displacement motors, enables a higher rotational speed, compared to the state of the art, to be achieved on the travelling device driven by the fixed displacement motor at the same hydraulic volumetric flow rate.

The use of a fixed displacement motor with a reduced displacement volume in comparison with the maximum displacement volume of the variable displacement motors also achieves a higher rotational speed than in the state of the art at the same volumetric flow rate.

A higher travelling speed of the construction machine may thus be achieved particularly advantageously, or the speed already achievable in the state of the art may be achieved at a lower delivery rate of the hydraulic pump of the drive system. In the second case, a combustion engine driving the pump may thus be operated at a lower rotational speed, and the fuel demand and emissions may thus be reduced.

In the milling operation, the variable displacement motors may be operated like fixed displacement motors, that is, at a constant displacement volume. It is particularly preferred for the variable displacement motors to be operated at the maximum displacement volume, since the maximum torque may be provided as a result.

The transmission ratio is the ratio of the rotational speed of the drive system to the rotational speed of the driven system, or also the torque of the driven system to the torque of the drive system.

The transmission ratio of the first gearbox may be lower by a minimum of 15%, preferably by a minimum of 20%, than the transmission ratio of the respective second gearboxes.

Alternatively or additionally, the displacement volume of the fixed displacement motor may be smaller by a minimum of 15%, preferably by a minimum of 20%, than the maximum displacement volume of the variable displacement motors.

The transmission ratio of the first gearbox may be lower by 15% to 50%, preferably by 30% to 40%, than the transmission ratio of the respective second gearboxes.

Alternatively or additionally, the displacement volume of the fixed displacement motor may be lower by 15% to 50%, preferably by 20% to 30%, than the maximum displacement volume of the variable displacement motors.

The first gearbox and/or the second gearbox may each be a planetary gearbox.

The hydraulic drive system may comprise hydraulic flow dividers, which divide the hydraulic volumetric flow rate into partial volumetric flow rates, wherein a first partial volumetric flow rate drives the fixed displacement motor and the remaining partial volumetric flow rates each drive one hydraulic variable displacement motor.

In the construction machines according to the state of the art, flow dividers are relevant in particular during the milling operation; the variable displacement motors are then (in the design with flow divider) essentially operated as fixed displacement motors. This means that all four motors behave like identical fixed displacement motors. The flow divider then ensures even distribution of the volumetric flow rates and thus identical rotational speeds at the motors.

In the solution according to the present invention, the flow divider is preferably an asymmetrical flow divider, wherein the first partial volumetric flow rate is preferably a smaller volumetric flow rate than the remaining volumetric flow rates. It may thus be ensured that the travelling device arranged on the fixed displacement motor is driven at the same rotational speed as the remaining travelling devices.

The hydraulic drive system may comprise a controllable valve in the supply line assigned to the hydraulic fixed displacement motor.

The controllable valve may be a throttle valve or a volumetric flow rate control valve.

Four travelling devices may be provided, all of which are drivable by means of the hydraulic drive system.

In the hydraulic drive system, the respective hydraulic variable displacement motors may each be arranged between the hydraulic pump and the respective second gearbox.

At least one of the at least three travelling devices may be realized as a pivotable travelling device so that said travelling device is pivotable about at least one vertical pivoting axis in relation to the machine frame between a first pivoted-in and at least one second pivoted-out position. The fixed displacement motor, and therefore the first gearbox, may preferably be arranged on the pivotable travelling device.

The hydraulic variable displacement motors may be hydraulic axial piston motors.

The hydraulic pump may be a hydraulic axial piston pump.

The hydraulic fixed displacement motor may be a non-adjustable axial piston motor.

At least one travelling device may be steerable. It is also possible for at least two or three or all travelling devices to be steerable. The steerable travelling devices may each be steerable about a longitudinal axis. The steering axis extends preferably vertically through the travelling device, wherein said axis extends, in particular, centrally through the travelling device.

The pivotable travelling device may also be steerable about a steering axis, wherein the vertical pivoting axis is offset in relation to the steering axis.

According to the present invention, a method for working ground pavements using a construction machine self-propelled by means of at least three travelling devices, in particular road milling machine, may also be provided, in which a working device, in particular a milling drum, works the ground pavement, wherein at least two travelling devices are driven by a hydraulic drive system, wherein the hydraulic drive system comprises at least one hydraulic pump, and wherein one of the driven travelling devices is driven by means of a fixed displacement motor and the remaining driven travelling devices are each driven by means of a hydraulic variable displacement motor, wherein a first gearbox is arranged between the fixed displacement motor and the associated travelling device, and wherein one second gearbox each is arranged between the remaining driven travelling devices and the respective hydraulic variable displacement motors.

The first gearbox between the fixed displacement motor and the associated travelling device may be operated at a transmission ratio that is lower than the respective transmission ratios of the second gearboxes, which are each arranged between the respective hydraulic variable displacement motors and the respective travelling device, and/or the displacement volume of the fixed displacement motor may be smaller than the maximum displacement volume of the variable displacement motors.

The first gearbox may be driven at a transmission ratio that is lower by a minimum of 15%, preferably by a minimum of 20%, than the respective transmission ratios of the second gearboxes.

Alternatively or additionally, the displacement volume of the fixed displacement motor may be smaller by a minimum of 15%, preferably by a minimum of 20%, than the maximum displacement volume of the variable displacement motors.

The first gearbox may be operated at a transmission ratio that may be lower by 15% to 50%, preferably by 30% to 40%, than the transmission ratio of the respective second gearboxes.

Alternatively or additionally, the displacement volume of the fixed displacement motor may be lower by 15% to 50%, preferably by 20% to 30%, than the maximum displacement volume of the variable displacement motors.

At least one of the at least three travelling devices may be realized as a pivotable travelling device, which may be pivoted about a vertical pivoting axis in relation to the machine frame between a first pivoted-in and at least one second pivoted-out position, and wherein at least one of the at least two driven travelling devices is the pivotable travelling device.

The hydraulic fixed displacement motor may be controlled via a controllable valve.

BRIEF DESCRIPTION OF THE DRAWINGS

The following is shown schematically.

DETAILED DESCRIPTION

Figure 1:
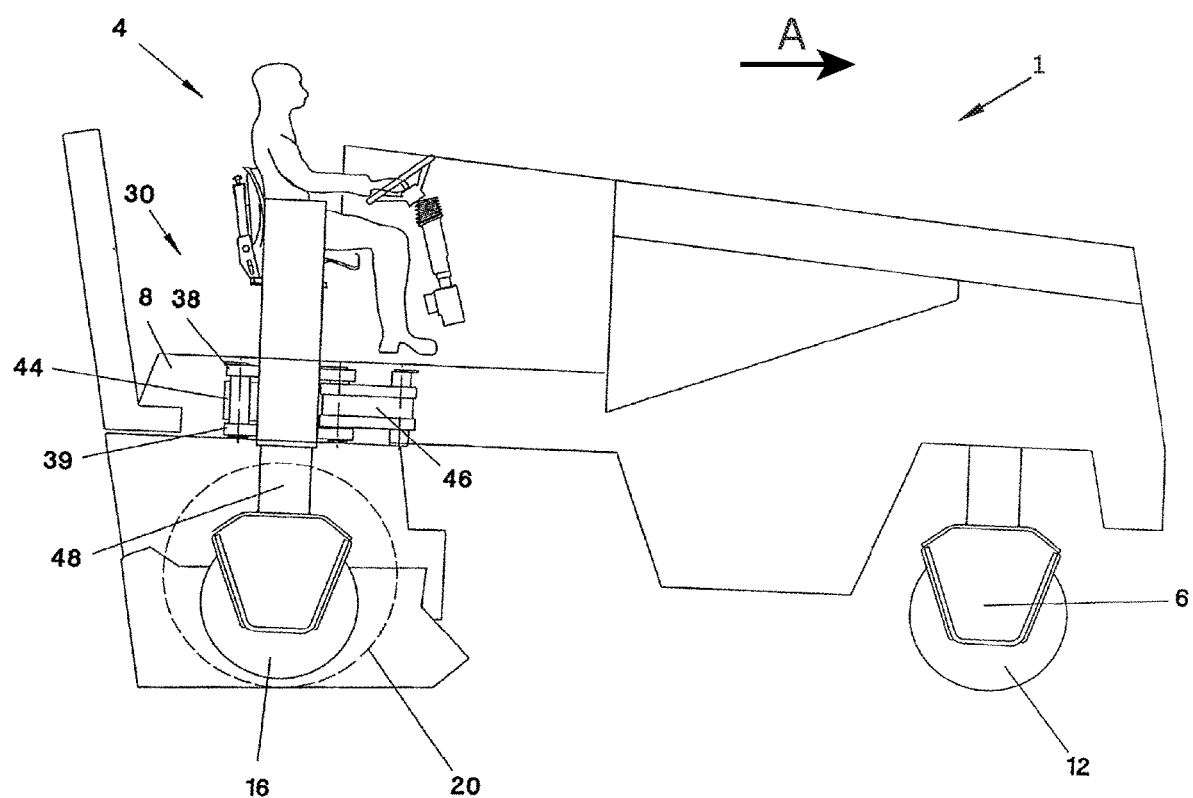
FIG. 1 a construction machine according to the present invention.

FIG. 1 shows a self-propelled construction machine 1. In the embodiment depicted, the self-propelled construction machine is a road milling machine. Said construction machine 1 comprises a machine frame 8 and at least three travelling devices 12, 16. The construction machine 1 depicted comprises two front and two rear travelling devices 12, 16, of which, in FIG. 1, the ground-engaging units arranged on the left side as seen in the direction of operation A are not visible. The travelling devices may be wheels, as in the embodiment depicted, or alternatively also tracked ground-engaging units.

Figure 2:
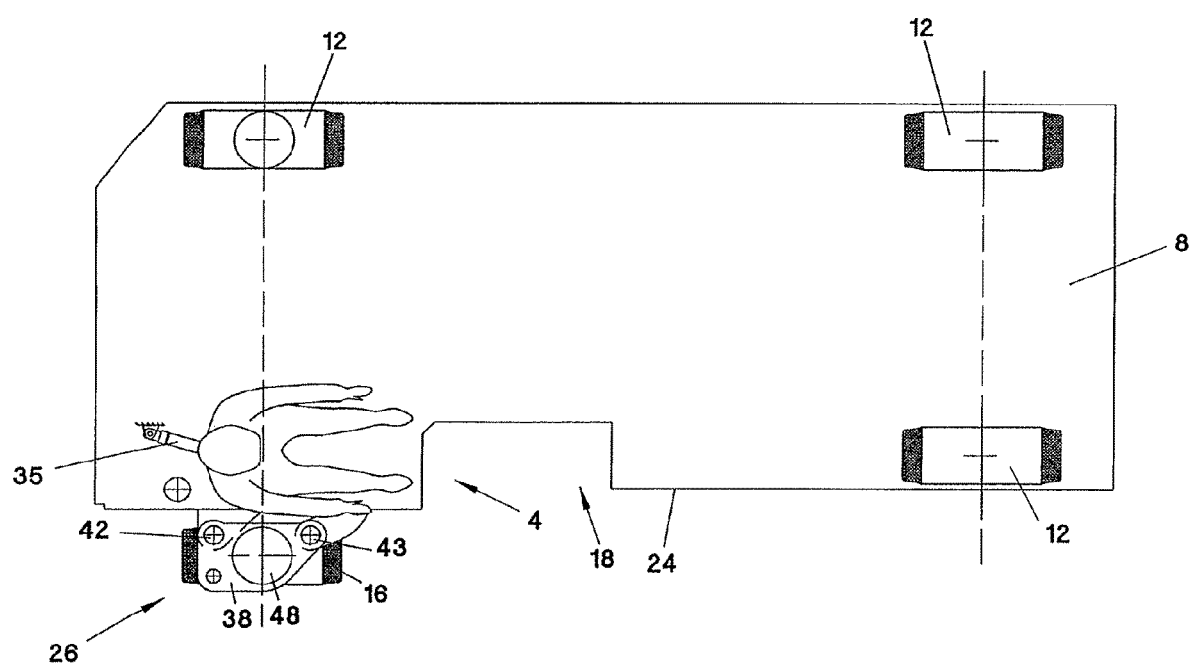
FIG. 2 a top view of the construction machine according to the present invention, FIG. 3 drive trains of the construction machine, FIG. 4 a schematic overview of a hydraulic drive system, FIG. 5 a schematic overview of an alternative hydraulic drive system, FIG. 6a-6c movement of the pivotable travelling device.

The travelling devices 12, 16 may each be driven by means of at least one hydraulic drive system 70. In a construction machine 1, at least two of the travelling devices 12, 16 may be driven, wherein, for example, the front travelling devices may also be non-driven. One of the at least three travelling devices 12, 16 may be realized as a pivotable travelling device 16 as shown in the embodiment depicted. Said travelling device 16 may be pivotable about at least one vertical pivoting axis in relation to the machine frame 8 between a first pivoted-in and at least one second pivoted-out position. This is explained in more detail based on FIGS. 2 and 6 a-c.

Furthermore, at least one working device 20 is provided, which, as in the embodiment depicted, may be a milling drum to work the ground pavement 3. The at least one pivotable travelling device 16 may also be drivable by means of the hydraulic drive system 70. As can be inferred from FIG. 2, the construction machine 1 may comprise a so-called zero-clearance side 24. The working device 20, with its one front end, may be arranged nearly flush with the zero-clearance side 24 of the machine frame 8 so that close-to-edge working is possible on the zero-clearance side of the construction machine 1. For this purpose, the pivotable travelling device 16 is pivoted, from the pivoted-out position 26 beyond the zero-clearance side plane depicted in FIG. 2, inwards into a cut-out 18 of the machine frame 8 so that the outer edge of the pivotable travelling device may terminate flush with the zero-clearance side 24.

The pivoting device for the pivotable travelling device 16 may comprise a link mechanism 30. The link mechanism may, for example, be designed, as depicted, with four articulations 40, 41, 42, 43 comprising vertical axes of articulation and with two links 44, 46 pivotable in a horizontal plane. Two articulations 40, 41 may be provided on the machine frame 8 in a stationary fashion, and two articulations 42, 43 may each be provided on the pivotable travelling device 16 in two vertically spaced support plates 38, 39.

The pivotable travelling device may also be pivotable in more than one outer pivoted-out position.

Figure 3:
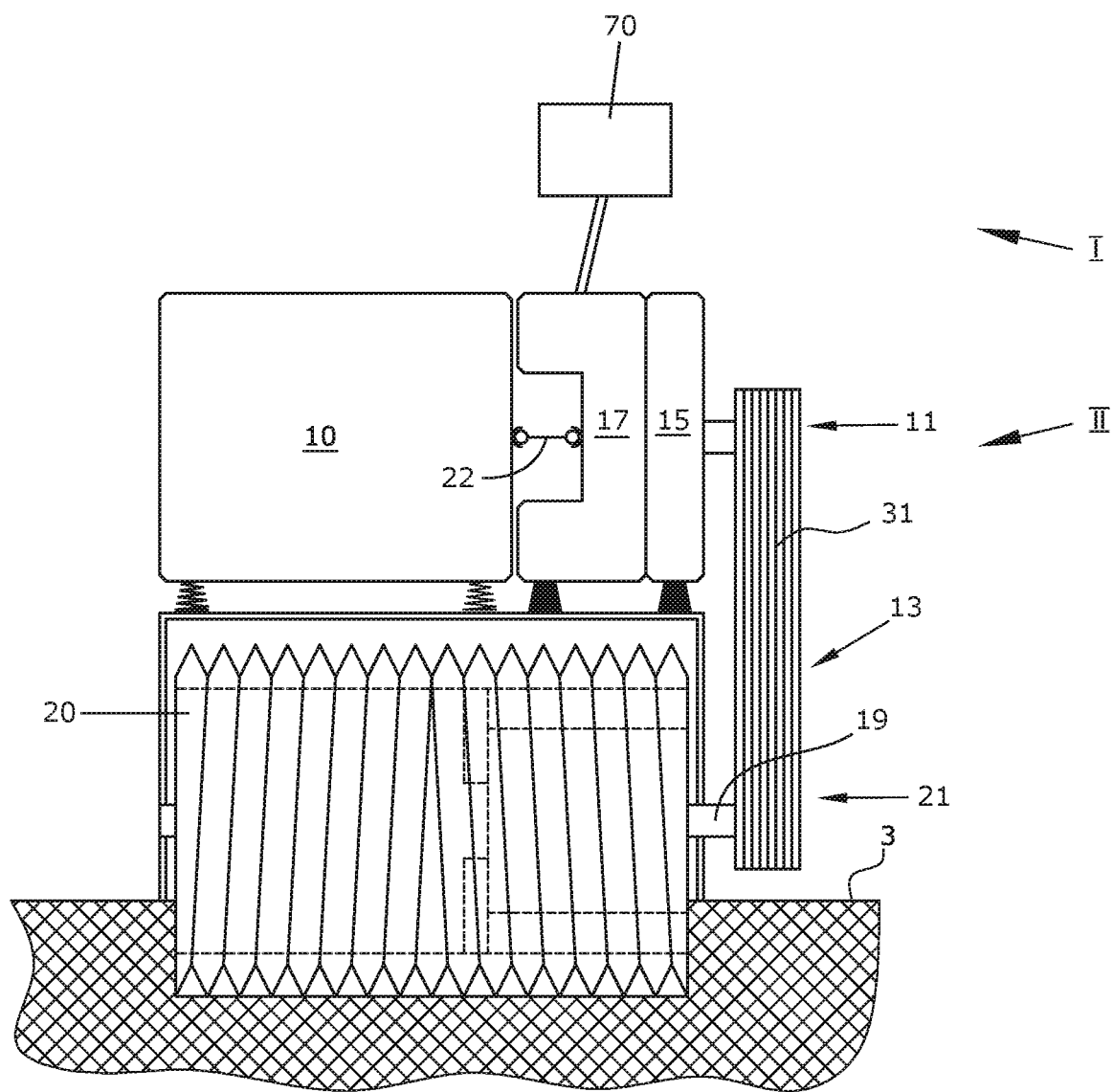

FIG. 3 shows a drive train of the construction machine 1. A first drive train I serves the purpose of transmitting the driving power to the travelling devices 12, 16. Said drive train I comprises a hydraulic drive system 70. A second drive train II is provided for transmitting the driving power to the milling drum 20. The hydraulic drive train 70 is explained in more detail in FIG. 4. The drive train II for driving the milling drum 20 is depicted in more detail in FIG. 3. A drive motor, in particular a combustion engine 10, may be provided. The drive motor 10 may be provided, via a flexible connection 22, with a pump transfer gearbox 17 for driving the first drive train I for driving a hydraulic drive system 70 for driving the travelling devices 12, 16.

In the second drive train II for driving the milling drum 20, a clutch 15 may be provided between the drive motor 10 and the milling drum 20. Said clutch 15 may be a device for switching the torque.

A traction mechanism 13 for the mechanical drive of the milling drum 20 may be arranged between the clutch 15 and the milling drum 20. The traction mechanism 13 comprises a drive element 11 which is coupled, in a torsionally rigid fashion, to the drive shaft of the drive motor 10. The traction mechanism 13 furthermore comprises a drive element 21 which is coupled, in a torsionally rigid fashion, to the drive shaft 19 of the milling drum 20. A gearbox may also be arranged between the drive shaft 19 and the milling drum 20.

The traction mechanism 13 is preferably a belt drive, wherein the drive elements and driven elements may be comprised of belt pulleys 11, 21, with one or a plurality of drive belts 31 running over said belt pulleys 11, 21, wherein the drive elements and driven elements may be comprised of sprockets. In principle, the drive motor may also be hydraulic or electric.

Figure 4:
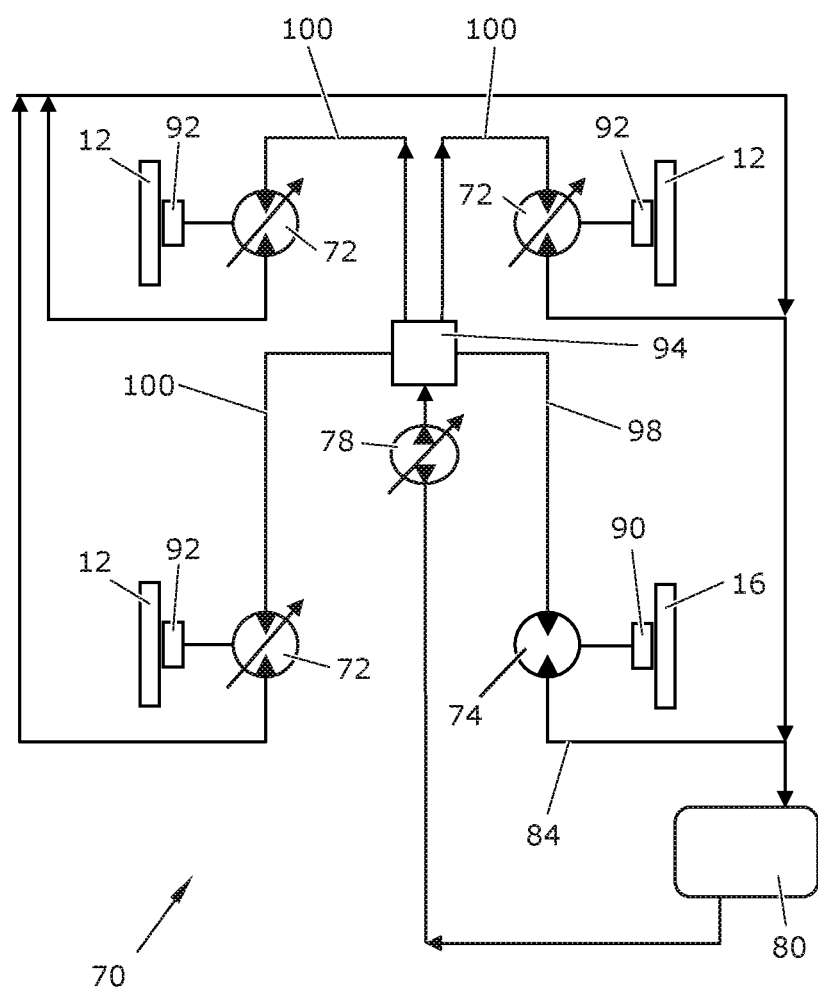

The hydraulic drive system 70 is depicted in a roughly schematic manner in FIG. 4. Said hydraulic drive system comprises at least one hydraulic pump 78, preferably a hydraulic variable displacement pump.

The hydraulic drive system 70 comprises a hydraulic fixed displacement motor 74 for driving the driven travelling device 16, and one each hydraulic variable displacement motor 72 for driving the remaining driven travelling devices 12.

Furthermore, the hydraulic drive system may comprise a hydraulic reservoir 80.

A hydraulic fixed displacement motor features a smaller installation space than a hydraulic variable displacement motor.

A first gearbox 90 is arranged between the fixed displacement motor 74 and the associated travelling device 16, and one second gearbox 92 each is arranged between the remaining driven travelling devices 12 and the respective hydraulic variable displacement motors 72.

The transmission ratio of the first gearbox 90 between the fixed displacement motor 74 and the associated travelling device 16 is lower than the respective transmission ratios of the second gearboxes 92, which are each arranged between the respective hydraulic variable displacement motors 72 and the respective travelling device 12. The transmission ratio is the ratio of the rotational speed of the drive system to the rotational speed of the driven system, or also the torque of the driven system to the torque of the drive system.

This has the advantage that a lower torque applies to the travelling device 16 at the same volumetric flow rate, and the travelling device 16 arranged on the first gearbox may be operated at a higher rotational speed and the machine may therefore be operated at a higher speed.

It may also be alternatively or additionally provided that the displacement volume of the fixed displacement motor 74 is smaller than the maximum displacement volume of the variable displacement motors 72. The use of a fixed displacement motor 74 with a reduced displacement volume in comparison with the maximum displacement volume of the variable displacement motors 72 also achieves a higher rotational speed than in the state of the art at the same volumetric flow rate. If the displacement volume of the fixed displacement motor 74 is smaller than the maximum displacement volume of the variable displacement motors 72, the first gearbox may also exhibit the same transmission ratio as the respective second gearboxes.

In either the case where the displacement volume of the fixed displacement motor 74 is smaller than the maximum displacement volume of the variable displacement motors 72, or the case where the transmission ratio of the first gearbox 90 between the fixed displacement motor 74 and the associated travelling device 16 is lower than the respective transmission ratios of the second gearboxes 92, or where both conditions are present, the result is that a ratio of volumetric flow rate of the hydraulic fixed displacement motor 74 to a corresponding speed of the associated traveling device 16 is lower than a ratio of a volumetric flow rate of the hydraulic variable displacement motor 72 at maximum displacement volume to a corresponding speed of the associated traveling device 12. The respective speeds of the traveling devices can be expressed either as rotational speeds or as traveling speeds. If the distance traveled per rotation for the two traveling devices are the same then either rotational speed or traveling speed can be used. On the other hand, if for example wheeled traveling devices are used and one wheel is of greater diameter than the other, then the respective traveling speeds are more relevant.

A hydraulic flow divider 94 may be provided, which divides the hydraulic volumetric flow rate into partial volumetric flow rates 98, 100, wherein a first partial volumetric flow rate 98 drives the fixed displacement motor 74, and the remaining partial volumetric flow rates 100 each drive one hydraulic variable displacement motor 72. The first partial volumetric flow rate 98 and the remaining partial volumetric flow rates 100 are preferably not the same. The first partial volumetric flow rate 98 is preferably smaller than the respective remaining partial volumetric flow rates 100.

In the solution according to the present invention, the flow divider is an asymmetrical flow divider, wherein the first partial volumetric flow rate 98 is preferably a smaller volumetric flow rate than the remaining volumetric flow rates 100. It may thus be ensured that the travelling device arranged on the fixed displacement motor is driven at the same rotational speed as the remaining travelling devices.

Figure 5:
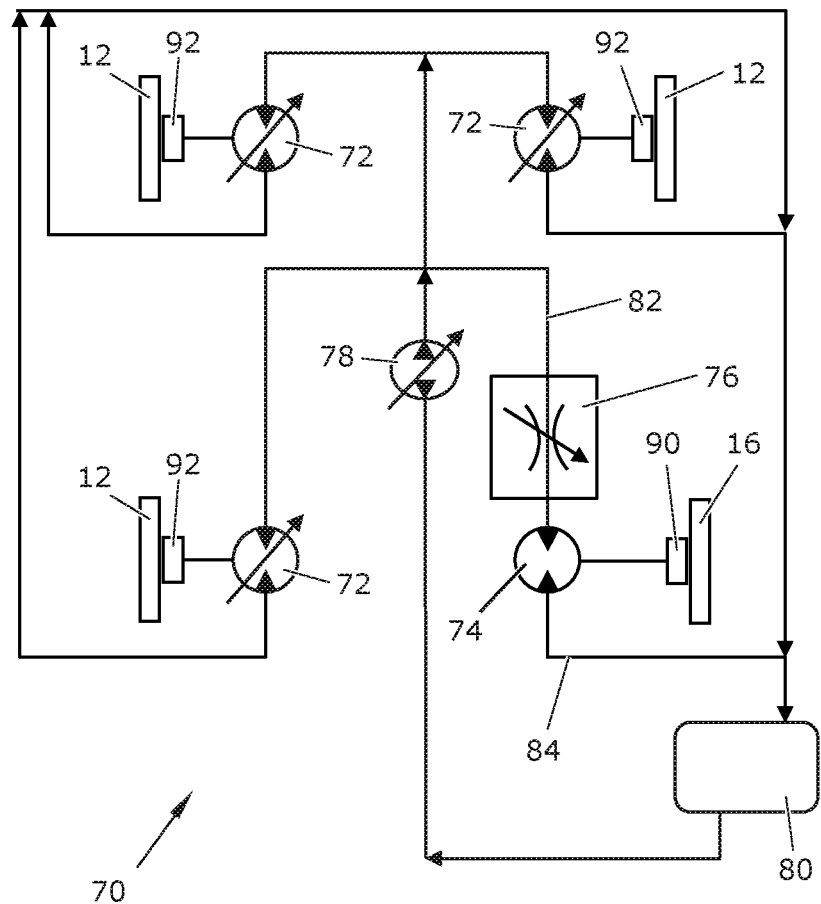

FIG. 5 shows an alternative embodiment, which is very similar to the embodiment according to FIG. 4, but with the difference that, in lieu of the flow divider 94, a controllable valve 76, in particular a throttle valve, is arranged in the supply lines 82, 84 assigned to the hydraulic fixed displacement motor 74. The hydraulic supply lines assigned to a hydraulic variable or fixed displacement motor are, in each case, those hydraulic lines in the hydraulic drive system 70, which run from the hydraulic pump to the respective variable or fixed displacement motor, or also run from the respective variable or fixed displacement motor to a hydraulic reservoir. The supply lines assigned to the fixed displacement motor in the embodiment depicted are lines 82, 84. The supply line 82 leads from the hydraulic pump 78 to the hydraulic fixed displacement motor 74. The supply line 84 leads from the fixed displacement motor 74 to the hydraulic reservoir 80. In the embodiment depicted, the controllable valve 76 is arranged in the supply line 82 between the hydraulic pump 78 and the hydraulic fixed displacement motor 74.

By means of the controllable valve 76, the hydraulic fixed displacement motor 74 may be controlled in such a fashion that a behaviour similar to that of a hydraulic variable displacement motor may be achieved. The controllable valve 76 realized as a throttle valve is preferably a proportional valve. The drop in pressure at the throttle valve, and therefore the hydraulic pressure at the hydraulic motor, may be changed via the throttle valve, thereby adjusting the torque of the fixed displacement motor.

In principle, it is also possible to control the volumetric flow rate by means of a volumetric flow rate control valve in lieu of a throttle valve, and thus to specify the rotational speed of the hydraulic motor and therefore also of the travelling device.

Figure 6A:
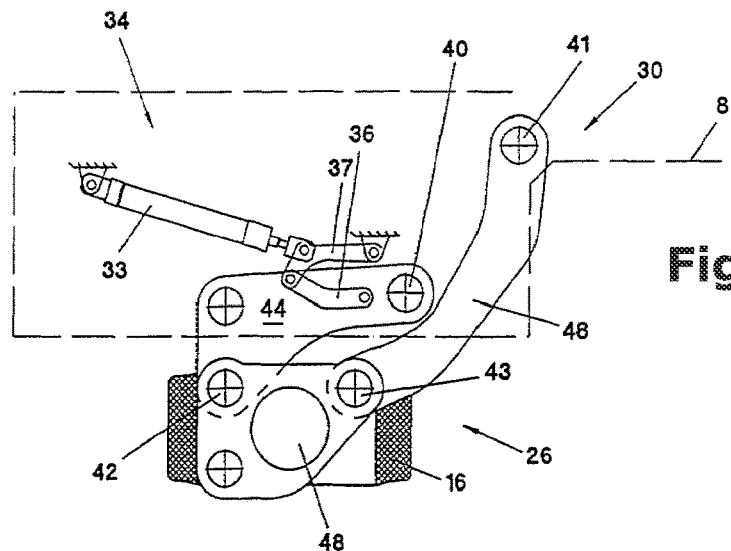
Figure 6B:
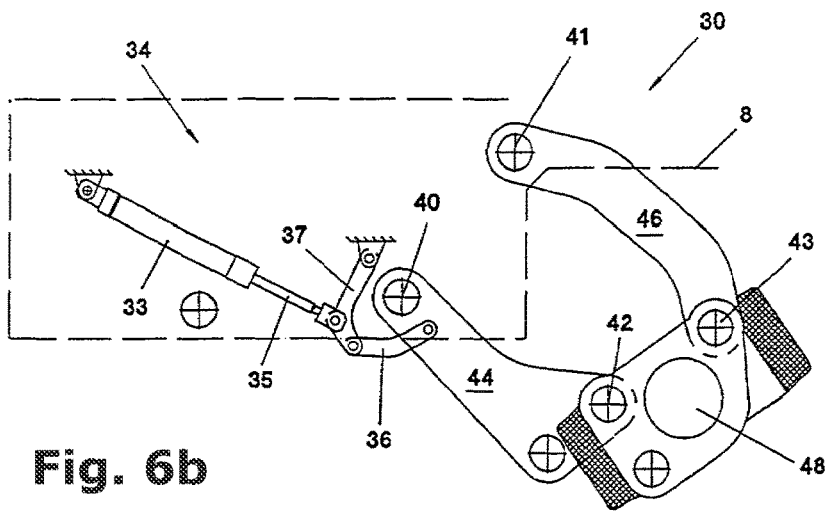
Figure 6C:
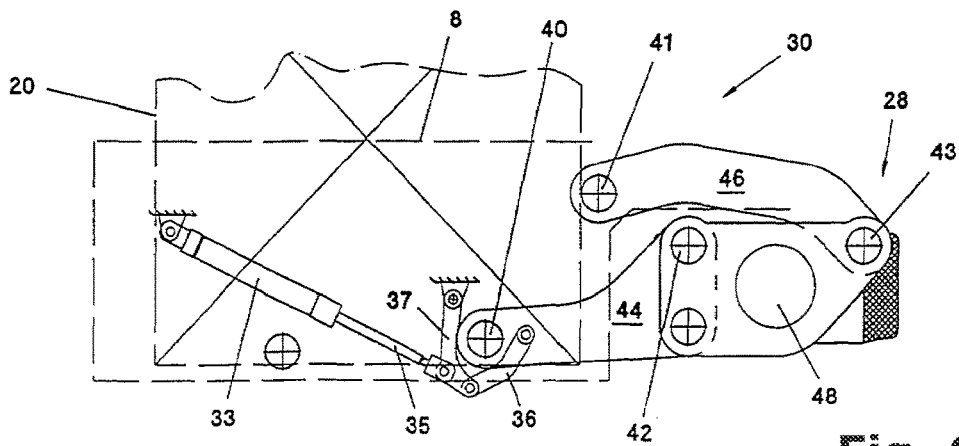

It is once again illustrated in more detail in FIGS. 6*a* to 6*c* as to how the pivotable travelling device 16 may be pivoted. The travelling device 16 may be moved from a second pivoted-out position 26 into a first pivoted-in position 28 by means of a driving device 34. There may also be more than one pivoted-out position.

The driving device 34 is comprised of a hydraulic piston-cylinder unit 33 comprising a push rod 35 and two control arms 36, 37. The control arm 37 is designed as a two-armed lever, wherein the one end is mounted on the machine frame 8 and the other end is connected to the second control arm 36 in an articulated fashion. The other end of the second control arm 36 is connected to the link 44 of the pivoting device.

The push rod 35 may be operated by the vehicle operator on the operator's platform 4. In the retracted position of the push rod 35, the travelling device 16 is in the second pivoted-out position, projecting beyond the zero-clearance side 24. In the extended condition of the push rod 35, the link mechanism 30 is pivoted so that the travelling device 16 may be moved into the first pivoted-in position. Prior to the pivoting operation, the travelling device 16 may be raised by means of the lifting column 48 in order that the travelling device 16 may be pivoted without ground contact. Locking of the link mechanism 30 may be effected in the first pivoted-in position. In principle, other pivoting devices are also known in which pivoting may be effected, for example, while maintaining the ground contact of the travelling device 16.

The pivotable travelling device 16 may be pivotable about vertical pivoting axes 40, 41. The vertical pivoting axis, about which the pivotable travelling device may be pivoted, may also be movable.

The invention claimed is:

1. A self-propelled construction machine, comprising:
   a machine frame including a cut-out in one side of the machine frame;
   at least first, second and third traveling devices configured to support the machine frame from a ground surface, the first traveling device being a pivotable first traveling device configured to be pivotable relative to the machine frame about at least one vertical pivoting axis between a pivoted-in position wherein the first traveling device is received in the cut-out of the machine frame and at least one pivoted-out position wherein the first traveling device is located beyond the one side of the machine frame;
   at least one working device supported from the machine frame for working the ground surface;
   at least one hydraulic drive system configured to drive at least the first and second traveling devices, the hydraulic drive system including:
   at least one hydraulic pump;
   a first hydraulic motor for driving the first traveling device;
   a second hydraulic motor for driving the second traveling device;
   a first gearbox arranged between the first hydraulic motor and the first traveling device;
   a second gearbox arranged between the second hydraulic motor and the second traveling device;
   wherein:
   (a) a transmission ratio of the first gearbox is lower than a transmission ratio of the second gearbox; and/or
   (b) a displacement volume of the first hydraulic motor is smaller than a maximum displacement volume of the second hydraulic motor.

2. The self-propelled construction machine of claim 1, wherein:
   both elements (a) and (b) are present.

3. The self-propelled construction machine of claim 1, wherein:
   element (a) is present, but element (b) is not present.

4. The self-propelled construction machine of claim 1, wherein:
   element (b) is present, but element (a) is not present.

5. The self-propelled construction machine of claim 1, wherein:
   element (a) is present and the transmission ratio of the first gearbox is at least 15% lower than the transmission ratio of the second gearbox.

6. The self-propelled construction machine of claim 1, wherein:
   element (a) is present and the transmission ratio of the first gearbox is at least 20% lower than the transmission ratio of the second gearbox.

7. The self-propelled construction machine of claim 1, wherein:
   element (a) is present and the transmission ratio of the first gearbox is 15% to 50% lower than the transmission ratio of the second gearbox.

8. The self-propelled construction machine of claim 1, wherein:
   element (a) is present and the transmission ratio of the first gearbox is 20% to 30% lower than the transmission ratio of the second gearbox.

9. The self-propelled construction machine of claim 1, wherein:
   element (b) is present and the displacement volume of the first hydraulic motor is at least 15% smaller than the maximum displacement volume of the second hydraulic motor.

10. The self-propelled construction machine of claim 1, wherein:
    element (b) is present and the displacement volume of the first hydraulic motor is at least 20% smaller than the maximum displacement volume of the second hydraulic motor.

11. The self-propelled construction machine of claim 1, wherein:
element (b) is present and the displacement volume of the first hydraulic motor is 15% to 50% smaller than the maximum displacement volume of the second hydraulic motor.

12. The self-propelled construction machine of claim 1, wherein:
element (b) is present and the displacement volume of the first hydraulic motor is 20% to 30% smaller than the maximum displacement volume of the second hydraulic motor.

13. The self-propelled construction machine of claim 1, wherein:
at least one of the first and second gearboxes is a planetary gearbox.

14. The self-propelled construction machine of claim 1, wherein:
the hydraulic drive system further includes a hydraulic flow divider configured to divide a hydraulic volumetric flow rate into partial volumetric flow rates, wherein a first partial volumetric flow rate drives the first hydraulic motor and a second partial volumetric flow rate drives the second hydraulic motor.

15. The self-propelled construction machine of claim 1, wherein:
the hydraulic drive system further includes a controllable valve disposed in a supply line associated with the first hydraulic motor.

16. The self-propelled construction machine of claim 15, wherein:
the controllable valve is a throttle valve or a volumetric flow rate control valve.

17. The self-propelled construction machine of claim 1, further comprising:
a fourth traveling device; and
wherein each of the first, second, third and fourth traveling devices is driven by the hydraulic drive system.

18. A self-propelled construction machine, comprising:
a machine frame including a cut-out in one side of the machine frame;
at least first, second and third ground-engaging units configured to support the machine frame from a ground surface, the first ground-engaging unit being a pivotable first ground-engaging unit configured to be pivotable relative to the machine frame about at least one vertical pivoting axis between a pivoted-in position wherein the first ground-engaging unit is received in the cut-out of the machine frame and at least one pivoted-out position wherein the first ground-engaging unit is located beyond the one side of the machine frame;
a milling drum supported from the machine frame for working the ground surface;
at least one hydraulic drive system configured to drive at least the first and second ground-engaging units, the hydraulic drive system including:
a hydraulic pump;
a first hydraulic motor for driving the first ground-engaging unit;
a second hydraulic motor for driving the second ground-engaging unit;
a first gearbox arranged between the first hydraulic motor and the first ground-engaging unit;
a second gearbox arranged between the second hydraulic motor and the second ground-engaging unit; and
wherein the first and second hydraulic motors are configured such that a ratio of volumetric flow rate of the first hydraulic motor to a corresponding speed of the first ground engaging unit is lower than a ratio of a volumetric flow rate of the second hydraulic motor to a corresponding speed of the second ground engaging unit.

19. The self-propelled construction machine of claim 18, wherein:
the respective speeds of the first and second ground engaging units are measured as rotational speeds.

20. The self-propelled construction machine of claim 18, wherein:
the respective speeds of the first and second ground engaging units are measured as traveling speeds.

* * * * *